(12) United States Patent
Peil et al.

(10) Patent No.: US 12,743,196 B2
(45) Date of Patent: Sep. 22, 2026

(54) AUDIO MULTICORE PROCESSING

(71) Applicant: DSP Concepts, Inc., Santa Clara, CA (US)

(72) Inventors: Jeffrey Peil, Livonia, MI (US); Paul Eric Beckmann, Sunnyvale, CA (US)

(73) Assignee: DSP Concepts, Inc., Santa Clara, CA (US)

(*) Notice: Subject to any disclaimer, the term of this patent is extended or adjusted under 35 U.S.C. 154(b) by 507 days.

(21) Appl. No.: 18/132,787

(22) Filed: Apr. 10, 2023

(65) Prior Publication Data

US 2024/0338114 A1 Oct. 10, 2024

(51) Int. Cl.
*G06F 3/04847* (2022.01)
*G06F 3/0481* (2022.01)
*G06F 3/04842* (2022.01)

(52) U.S. Cl.
CPC ........ *G06F 3/04847* (2013.01); *G06F 3/0481* (2013.01); *G06F 3/04842* (2013.01)

(58) Field of Classification Search
CPC . G06F 3/04847; G06F 3/0481; G06F 3/04842
See application file for complete search history.

(56) References Cited

U.S. PATENT DOCUMENTS 5,862,231 A * 1/1999 Tokuhisa ............... G10H 7/004 84/602
7,414,634 B2 * 8/2008 Takemura .............. H04H 60/04 345/619
7,518,426 B1 * 4/2009 Smith .............. H03K 3/356156 327/199
7,729,898 B1 * 6/2010 Lytle ................... G06F 15/7867 702/108
7,991,606 B1 * 8/2011 D'Souza ................. G06F 30/33 703/28
8,595,695 B2 * 11/2013 Huin ......................... G06F 8/34 717/109
8,683,243 B2 3/2014 Wu et al.
(Continued)

OTHER PUBLICATIONS

Walker, Martin, "Multi-core Processors for Musicians", PC Musician, https://www.soundonsound.com/sound-advice/multi-core-processors-musicians, (Jan. 1, 2008).

*Primary Examiner* — Jeremy L Stanley
(74) *Attorney, Agent, or Firm* — Schwegman Lundberg & Woessner, P.A.

(57) ABSTRACT

Audio data processing is done in multiple data processors in a multiprocessor system or in multiple processing instances in a multi-instance system. The system includes shared memory, the shared memory being read and write accessible to all of the data processors or instances. The multiprocessor or multi-instance audio processing is designed by placing representations of audio processing modules in a user interface, as well as a representation of an inter-process communications (IPC) module that includes a target core or target processing instance identifier associated therewith. The specified target core or target instance identifier is applied downstream from the representation of the IPC module such that the target core or instance identifier is associated with the representations of the subsequent downstream audio modules in the audio design.

20 Claims, 8 Drawing Sheets

(56) References Cited

U.S. PATENT DOCUMENTS

| | | | | |
|---|---|---|---|---|
| 8,914,762 | B1 * | 12/2014 | Sinclair | G06F 30/327<br>716/112 |
| 10,379,887 | B2 | 8/2019 | Spracklen | |
| 11,516,582 | B1 * | 11/2022 | Dhanapalan | H04S 3/008 |
| 11,614,915 | B1 | 3/2023 | Beckmann | |
| 2003/0192027 | A1 | 10/2003 | Porter | |
| 2006/0179279 | A1 | 8/2006 | Jones et al. | |
| 2007/0198240 | A1 * | 8/2007 | Moriat | G06F 30/331<br>703/17 |
| 2011/0083091 | A1 * | 4/2011 | Huin | G06F 8/34<br>715/771 |
| 2014/0040855 | A1 * | 2/2014 | Wang | G06F 30/327<br>717/107 |
| 2015/0312116 | A1 | 10/2015 | Taheri et al. | |
| 2015/0348225 | A1 | 12/2015 | Schreyer et al. | |
| 2017/0068504 | A1 | 3/2017 | Trama et al. | |
| 2017/0192921 | A1 | 7/2017 | Wang et al. | |
| 2019/0272144 | A1 | 9/2019 | Kotelly et al. | |
| 2022/0360882 | A1 | 11/2022 | Chan et al. | |

* cited by examiner

AUDIO MULTICORE PROCESSING

BACKGROUND

Current audio playback devices, such as headphones, earbuds, smart speakers and so forth, have become more sophisticated and connected. The audio processing power that is available for use in such products has increased substantially. Multicore processors, in which an integrated circuit that has two or more processor cores attached for enhanced performance and reduced power consumption, provide further resources and opportunities for increased audio processing.

BRIEF DESCRIPTION OF THE SEVERAL VIEWS OF THE DRAWINGS

Some example embodiments of the present disclosure are illustrated by way of example and not limitation in the figures of the accompanying drawings, in which like reference numbers indicate similar elements. To easily identify the discussion of any particular element or act, the most significant digit or digits in a reference number refer to the figure number in which that element is first introduced.

DETAILED DESCRIPTION

Figure 1:
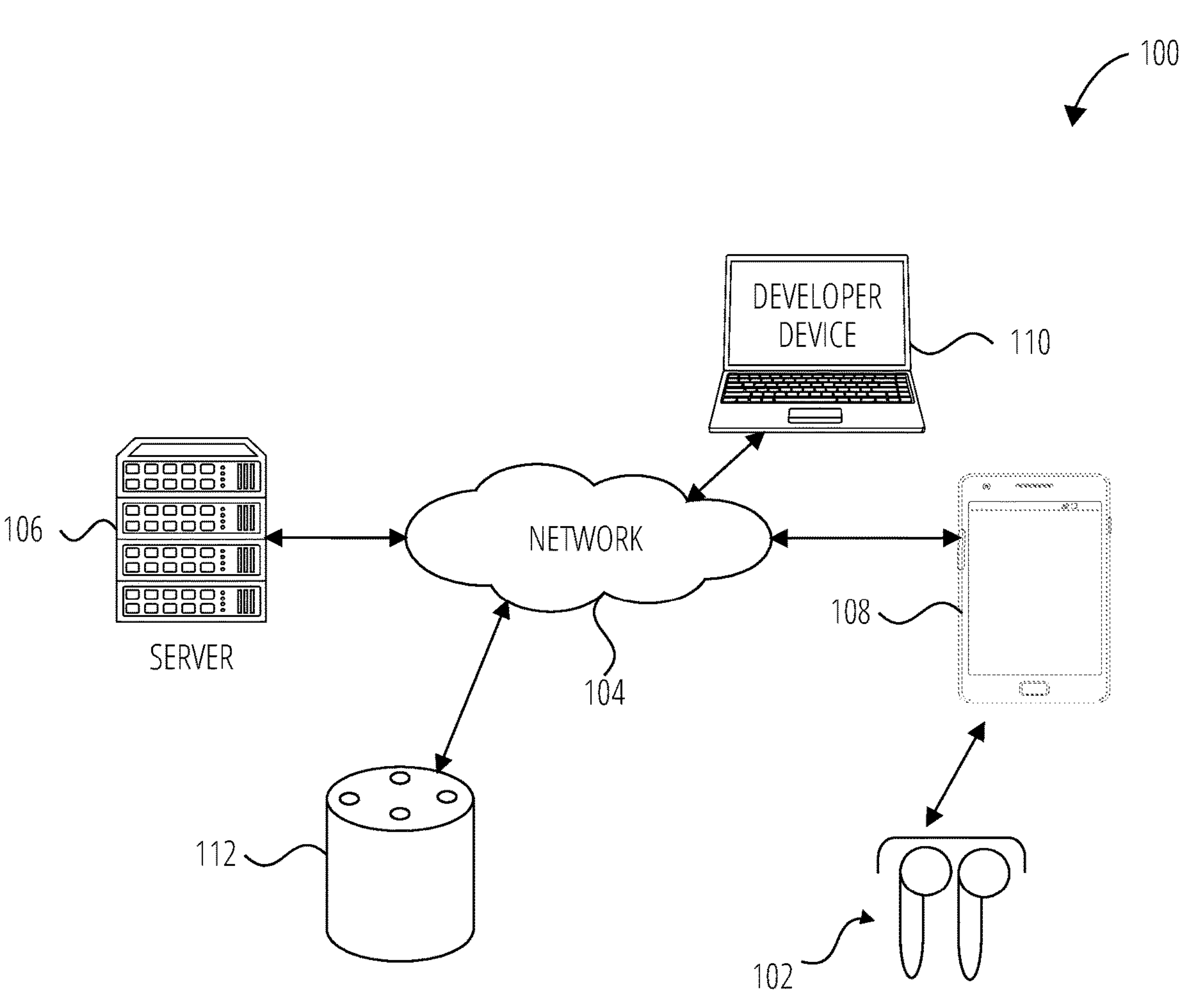
FIG. 1 illustrates a system in which a server, a client device and a developer device are connected to a network according to some examples.

Current methods for exploiting multiple processors in a multiprocessor system typically involve write separate programs for each processor core. In conventional embedded systems, each core is walled off from the other cores and the user has to write explicit program instructions for one core to pass messages to notify another core that data is incoming, to determine how much memory is required, to allocate memory in a memory that is accessible to other core, and notify the other core where in memory to look and to retrieve the information. Writing separate code for each core is cost intensive and inflexible. Cost and development time for using additional DSP cores in current audio setups is often cost prohibitive.

In some examples, provided is a method, executed by a data processor in a multiprocessor system including shared memory, the method including determining if input audio data addressed to the data processor has been received in shared memory; based on determining that input audio data addressed to the data processor has been received in shared memory, retrieving the input audio data from the shared memory; processing the input audio data to generate processed audio data; and writing the processed audio data to shared memory with an identifier that identifies a recipient data processor for the processed audio data.

Determining if input audio data has been received in shared memory may include polling a message buffer in the shared memory. Writing the processed audio data to shared memory may include writing the processed audio data to a packet buffer in the shared memory and writing the identifier of the recipient data processor to a message buffer in the shared memory.

In some examples, determining if input audio data has been received in shared memory further includes reading a core identifier in the message buffer and reading a frequency and audio sample size of the input audio data from the message buffer. The method may further include writing a frequency and audio sample size of the processed audio data to the message buffer.

Other examples provide a non-transitory computer-readable storage medium, the computer-readable storage medium including instructions that when executed by a data processor in a multiprocessor system including shared memory, cause the data processor to perform operations according to any of the methods set forth above, including but not limited to determining if input audio data addressed to the data processor has been received in shared memory; based on determining that input audio data addressed to the data processor has been received in shared memory, retrieving the input audio data from the shared memory; processing the input audio data to generate processed audio data; and writing the processed audio data to shared memory with an identifier that identifies a recipient data processor for the processed audio data.

Further examples provide a computing apparatus includes a data processor and a memory storing instructions that, when executed by the data processor in a multiprocessor system including shared memory, configure the apparatus to perform operations according to any of the methods set forth above. The operations may include but not are not limited to, determining if input audio data addressed to the data processor has been received in shared memory, based on determining that input audio data addressed to the data processor has been received in shared memory; retrieving the input audio data from the shared memory; processing the input audio data to generate processed audio data; and writing the processed audio data to shared memory with an identifier that identifies a recipient data processor for the processed audio data.

Other technical features may be readily apparent to one skilled in the art from the following figures, descriptions, and claims.

FIG. 1 illustrates a system 100 in which a server 106, a client device 108, a developer device 110 and a smart speaker 112 are connected to a network 104.

In various embodiments, the network 104 may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like. In some embodiments, the network 104 may also include a voice network that conveys not only voice communications, but also non-voice data such as Short Message Service ("SMS") messages, as well as data communicated via various cellular data communication protocols, and the like.

In various embodiments, the client device 108 may include desktop PCs, mobile phones, laptops, tablets, wearable computers, or other audio-capable computing devices that are capable of connecting to the network 104 and communicating with the server 106, such as described herein. Other audio devices such as smart speaker 112 may also connect directly to the network 104. The client device 108 may be paired with wireless ear buds 102 (or other audio playback devices) that provide audio output to a user of the client device 108.

Additionally, one or more developer devices 110 may be utilized to generate downloadable netlists or binary files that may be used to customize the audio output of the wireless ear buds 102. The developer device 110 may for example have one or more of the components and characteristics of the machine 800 described herein with reference to FIG. 8, including one or more processors 802, memory 804 and I/O components 842 such as a display and a keyboard, and so forth.

In various embodiments, additional infrastructure (e.g., short message service centers, cell sites, routers, gateways, firewalls, and the like), as well as additional devices may be present. Further, in some embodiments, the functions described as being provided by some or all of the server 106 and the client device 108 may be implemented via various combinations of physical and/or logical devices. However, it is not necessary to show such infrastructure and implementation details in FIG. 1 in order to describe an illustrative embodiment.

Figure 2:
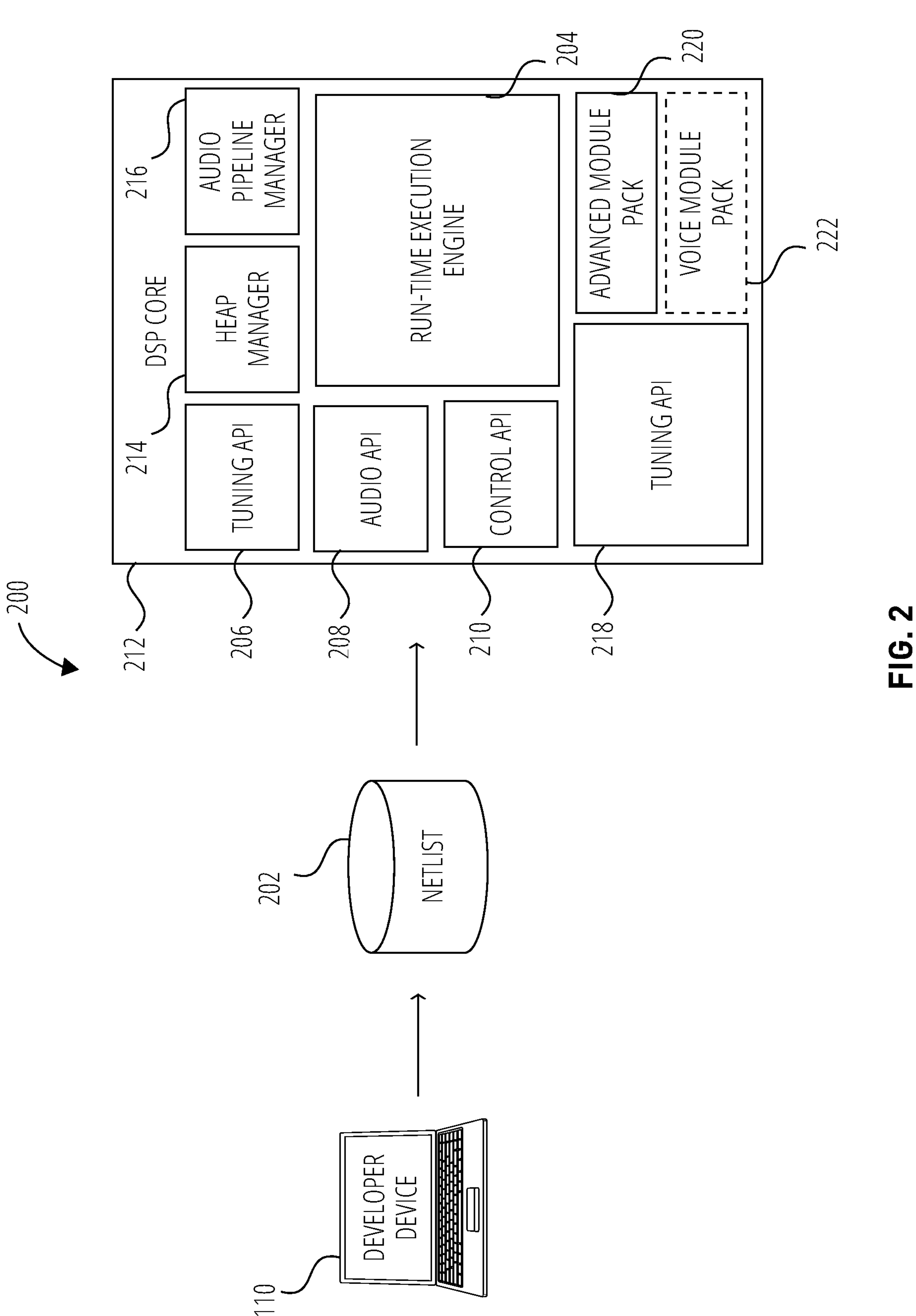
FIG. 2 illustrates an audio development and implementation system according to some examples.

FIG. 2 illustrates an audio development and implementation system 200 according to some examples. Shown in the figure are a developer device 110, a netlist 202 and an audio DSP core 212.

The developer device 110 hosts a software application for use in designing and developing audio features for the audio DSP core 212. The developer device 110 can be utilized by the developer of the audio device (such as wireless ear buds 102 or smart speaker 112) or a third-party developer of original audio processing, add-ons, or updates for the audio device.

The application on the developer device 110 is preferably a windows-based graphical design environment that permits the definition of audio processing pathways by assembling and interconnecting various audio processing blocks and specifying associated parameters and interconnections. The final output of the application is the netlist 202.

The netlist 202 is a configuration file for the data-driven audio DSP core 212 that specifies which audio modules in the audio DSP core 212 to use, how they are interconnected, and which parameter settings to employ to provide custom audio processing. The netlist 202 is a platform independent data file that targets specific run-time libraries in the audio DSP core 212.

The audio DSP core 212 is an embedded audio processing engine that includes optimized target-specific libraries for various audio processing applications. The audio DSP core 212 is available for multiple processors and supports multicore and multi-instance implementations. In some examples, the audio DSP core 212 includes a run-time execution engine 204 that can be controlled by multiple API's such as a tuning API 206, an audio API 208, and a control API 210. The audio DSP core 212 also includes a memory manager 214 and an audio pipeline manager 216. The audio DSP core 212 also includes various audio processing module packs, such as a standard module pack 218, advanced module pack 220 and a voice module pack 222. As indicated by the dashed outline for the voice module pack 222, the exact number and types of different packs will depend on the particular implementation.

Figure 3:
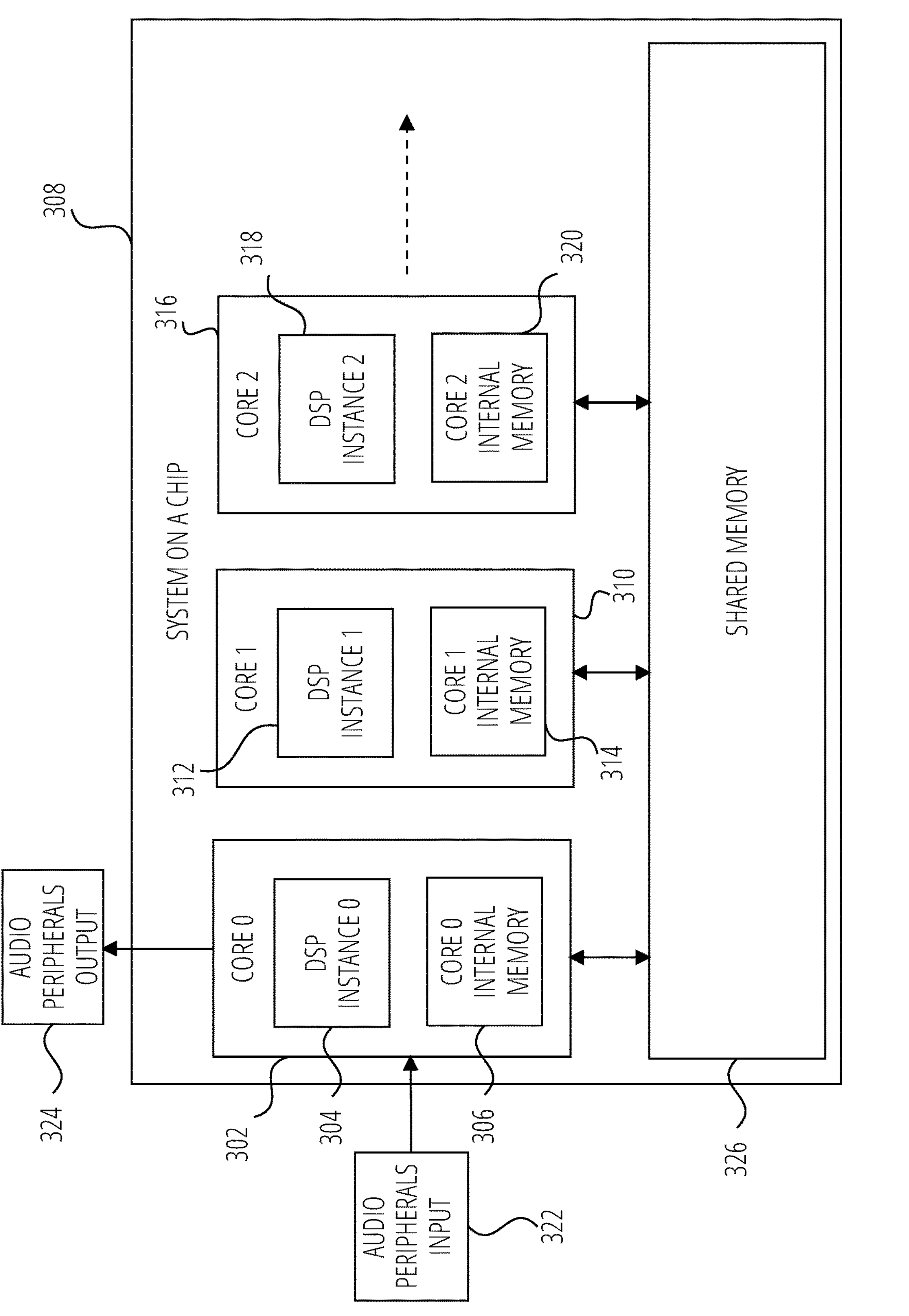
FIG. 3 illustrates a system on a chip with multiple cores, which could be implemented in the client device, wireless ear buds or other audio device, in some examples.

FIG. 3 illustrates a system on a chip 308 with multiple cores, which could be implemented in the client device 108, wireless ear buds 102, smart speaker 112 or other audio device, in some examples. The system on a chip 308 in the illustrated example includes three cores, core 0 302, core 1 310 and core 2 316, although it will be appreciated that more or less cores, but no less than two, could be included a multicore implementation. Also, while the cores are shown as being on the same system on chip, they could be distributed over one or more chips. Additionally, the cores need not be identical, and in some cases it can be advantageous for the cores to be different. For example, core 0 302 could be an ARM core, core 1 310 could be a Hi-Fi DSP, and so forth. The term "multicore" or "multiprocessor" is thus to be interpreted accordingly.

Although described herein particularly with reference to audio processing instances running on different cores, the methods and techniques herein are equally applicable to separate audio processing instances running on a single core. In such a case, an instance identifier is used to identify an instance to which audio data is to be passed, instead of a core identifier. The functioning of the separate instances in such an implementation is otherwise substantially identical to the functioning of the separate cores as described herein.

The system on a chip 308 also includes a shared memory 326, an audio peripherals input 322 and an audio peripherals output 324. The audio peripherals input 322 is for receiving an audio signal from audio peripherals such as a plurality of microphones, or from elsewhere, such as for example received over the network 104 from a remote participant, or via a short range data transmission protocol such as Bluetooth. The received audio signal is a digital audio signal, either as received by the audio device or converted and encoded by one or more DAC devices. The audio signal may include a number of channels of audio. The audio peripherals input 322 only provides input to core 0 302, which distributes all or part of the audio signal, or signals derived therefrom, to the other cores via shared memory 326.

Also provided is an audio peripherals output 324 from core 0 302, which provides processed digital audio signals for rendering by one or more audio peripherals such as loudspeakers, or for transmission over the network 104 or via a short range data transmission protocol such as Bluetooth.

The shared memory 326 of the system on a chip 308 is used to communicate and buffer audio data between the cores 302, 310, and 316. All data exchange between the cores is handled by the cores through the shared memory 326; no user protocol or user-specific inter-process communication (IPC) software needs to be written to facilitate such communications. Startup code running on the system on a chip 308 allocates a memory heap within the shared memory 326 memory in a region that is accessible to all of the cores 302, 310, and 316. This memory space is set aside in the shared memory 326 for temporarily storing packets being transmitted between cores 302, 310, and 316, and for passing messages between the cores.

A packet buffer is allocated in the shared memory region that is accessible to all of the cores 302, 310, and 316. A reply buffer pointer is allocated to the same memory region as the packet buffer. The packet buffer stores packets being transmitted between the cores 302, 310, and 316. Also provided is a message buffer that is used to notify a core that audio data has arrived in the shared memory for it. Conventional memory management techniques are used to avoid memory collisions.

Each core 302, 310, 316 has its own DSP instance (DSP instance 0 304, DSP instance 1 312, DSP instance 2 318 respectively, each comprising an audio DSP core 212 and associated netlist 202 as described above with reference to FIG. 2. Each core 302, 310, 316 also has its own fast, tightly-coupled internal core memory (core 0 internal memory 306, core 1 internal memory 314 and core 2 internal memory 320 respectively), used by each DSP instance in processing audio data retrieved from the shared memory 326, or additionally received from the audio peripherals input 322 in the case of core 0 302.

As far as each DSP instance 304, 312 and 318 is concerned, each other DSP instance is an audio processing "black box" and the cores/core instances do not need to know or be advised of the operational status of any other core/core instance. As far as passing audio data between the cores is concerned, all a core has to do is write the audio data with its inherited parameters (sample size, frequency and so forth) into the shared memory 326 with an identification of the destination core by its numeric ID and the origin core by its numeric ID. Each core periodically polls the shared memory 326 to determine if there is any data that has been received for that core. If so, the core retrieves and processes the data as specified in its netlist and then writes the output to the shared memory 326 with an identification of the next destination core. If data for that core is not present in the shared memory 326 when a core polls the memory, the core will poll the shared memory 326 again at its next polling cycle.

The exception is the core 0 302, which in addition to writing and reading from the shared memory as above, also receives audio data from audio peripherals input 322 and passes audio data to the audio peripherals output 324.

The core that is writing to the shared memory knows the parameters of the audio data that it is passing to the shared memory (for example one channel at 32 bits and 48 kHz) and can thus determine the size of the space in the shared memory that it needs to allocate when writing to the shared memory. The writing core also knows the identity of the destination core since this is specified in the netlist on which the core is operating.

As an alternative to polling by the cores, a memory manager can notify a core when data has been received in the shared memory 326 for that core.

Figure 4:
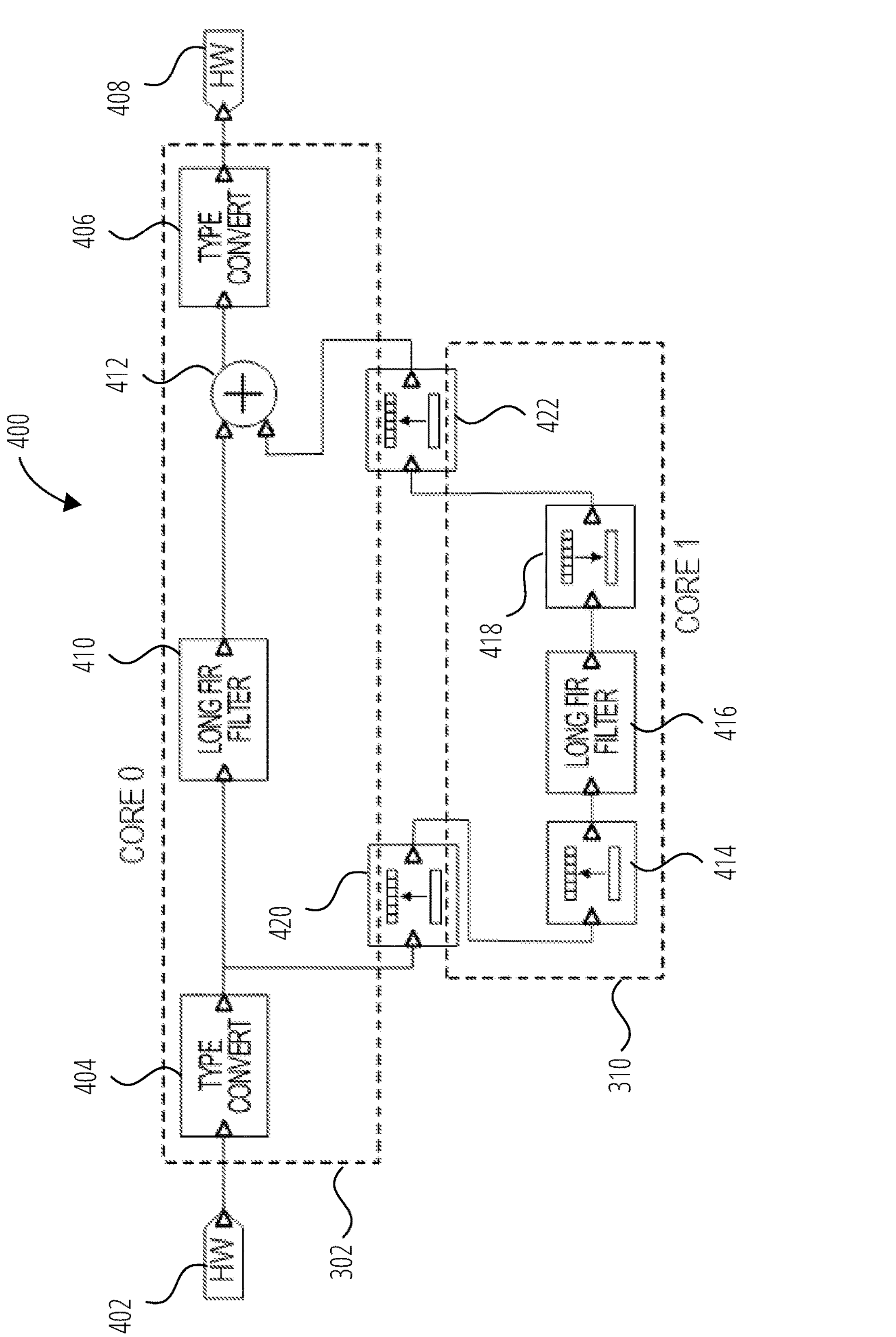
FIG. 4 illustrates a simple audio processing design operating on two cores, according to some examples.

FIG. 4 illustrates a simple audio processing design 400 according to some examples. The design 400 is generated using a design interface on an audio design application running on the developer device 110. The design interface provides a number of audio modules that can be used to build up sophisticated audio functions using a graphical user interface, similar to circuit design. The design interface permits selected audio modules to be placed in a design, modules to be interconnected, and the parameters of different modules to be specified.

Upon completion of the design 400, the application hosted by the developer device 110 generates two or more netlists 202 corresponding to the design 400, which can be embedded or downloaded to an audio product, to provide the specified audio processing in conjunction with the system on a chip 308. Each of the cores specified in the design will have its own unique and specific netlist 202.

It will be appreciated that the audio processing modules provided in the design interface are representations of the actual audio processing modules that are or may be available in the system on a chip 308, and are not the actual audio processing modules themselves. Associated with the representations of the audio processing modules used in the design interface is a collection of data that is used by the application hosted by the developer device 110 to generate the netlists 202, including an identification of each particular audio processing module to be used in each core, its parameters, and the interconnection between the different audio modules. Unless the context indicates otherwise, "an audio processing module" for purposes of the design interface is understood, for the sake of convenience, to include "a representation of an audio processing module."

The design 400 is a multiprocessor audio design utilizing two cores, core 0 302 and core 1 310. The core 0 302 audio design is a low latency path that implements an FIR filter module 410 using the 32 sample block size of an input audio data steam. The core 1 310 audio design is a more efficient implementation in which an FIR filter module 416 operates on a 256 sample block size.

The core 0 302 audio design receives a digital audio data stream from an input pin 402 of the audio peripherals input 322 at an input block size of, for example, 32 samples. The digital audio stream is first converted into an appropriate format for processing by a type conversion module 404. The audio stream is then processed in FIR filter module 410 before being combined with audio data from core 1 310 in adder module 412. The resulting output digital audio stream is then converted back into the system format by a type conversion module 406 before being provided to an output pin 408 of the audio peripherals output 324.

After the type conversion, the audio stream is also provided to core 1 310 as specified in IPC buffer module 420. IPC buffer module 420 specifies the destination for the audio data (DSP instance 1 312 on core 1 310 in this example) as well as any properties of the audio stream that have been inherited from the previous module, such as the sample size and bitrate. The IPC buffer module 420 will cause, in the implementing netlist, writing of the audio stream to the shared memory 326 with the audio properties and the identifier of the recipient DSP instance. The amount of space in shared memory 326 that is needed for the audio stream is determined from the properties of the audio stream, in particular the sample size and the bitrate.

Core 1 310, upon polling the shared memory 326 after the audio data has been saved there by core 0 302, will retrieve and load the data into its core 1 internal memory 314 and process the data according to its netlist. In this example, the audio input stream is first buffered up in buffer up module 414 from 32 samples to 256 sample. After processing by the FIR filter module 416, the processed audio data is then buffered down from 256 samples back to 32 samples in buffer down module 418 to permit adding of the outputs of the two threads at adder module 412 in core 0 302.

After buffering down as defined in buffer down module 418, the processed audio data is returned to core 1 310 as specified in IPC buffer module 422. As above, the IPC buffer module 422 specifies the destination for the audio data (DSP instance 0 304 on core 0 302 in this example) as well as any current properties of the audio stream, such as the sample size and bitrate. The IPC buffer module 422 will cause, in the implementing netlist, writing of the audio stream to the shared memory 326 with the audio properties and the identifier of the recipient DSP instance. The amount of space in shared memory 326 that is needed for the audio stream is determined from the properties of the audio stream, in particular the sample size and the bitrate.

Operation of the cores is synchronized by a start command issued by DSP instance 0 304 running on core 0 302 to all of the other cores in the system on a chip 308. All cores start simultaneously, and each core begins polling the shared memory 326 to determine, retrieve and process any audio data marked as being for that core. In addition, core 0 302 will begin processing any audio data received on audio peripherals input 322.

Figure 5:
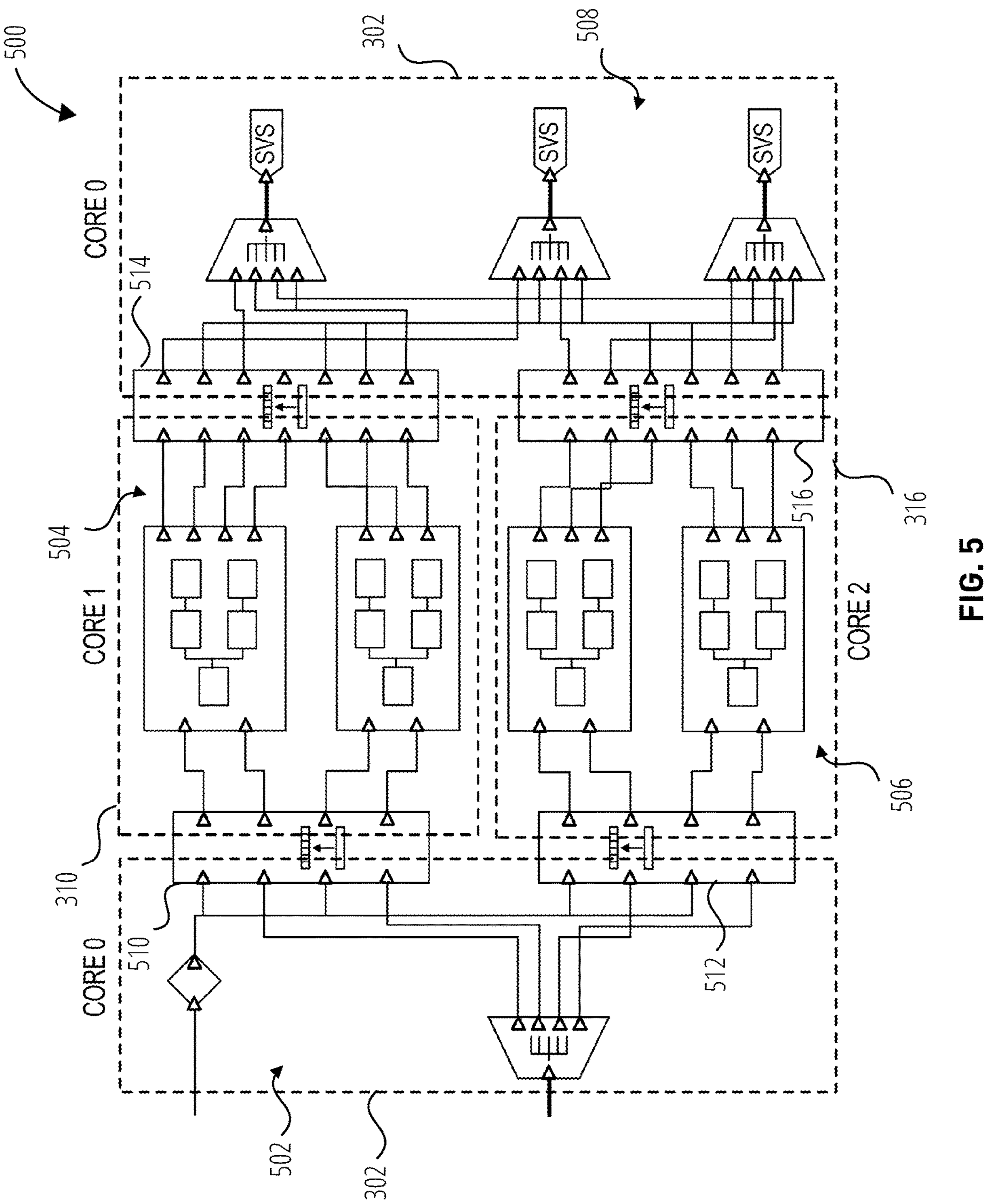
FIG. 5 illustrates an audio processing design utilizing multiple cores according to some examples.

FIG. 5 illustrates an audio processing design 500 utilizing multiple cores according to some examples. The design includes audio processing modules 502 with related interconnections, operating on core 0 302; audio processing modules 504 with related interconnections, operating on core 1 310; audio processing modules 506 with related interconnections, operating on core 2 316; and audio processing modules 508 with related interconnections, operating on core 0 302.

Passing of the data from the audio processing modules 502 running on core 0 302 to the audio processing modules 504 in core 1 310 is specified by IPC buffer module 510. Passing of the data from the audio processing modules 502 running on core 0 302 to the audio processing modules 506 in core 1 310 is specified by IPC buffer module 512. Return of the data from the audio processing modules 504 running on core 0 302 to the audio processing modules 508 in core 0 302 is specified by IPC buffer module 514. Finally, return of the data from the audio processing modules 506 running on core 2 316 to the audio processing modules 508 in core 0 302 is specified by IPC buffer module 514.

The audio data received by core 0 302 from core 1 310 can be distinguished from the data received from core 2 316 by the parameters passed by IPC buffer module 514 and IPC buffer module 516, which will include the numeric ID of the originating core.

Figure 6:
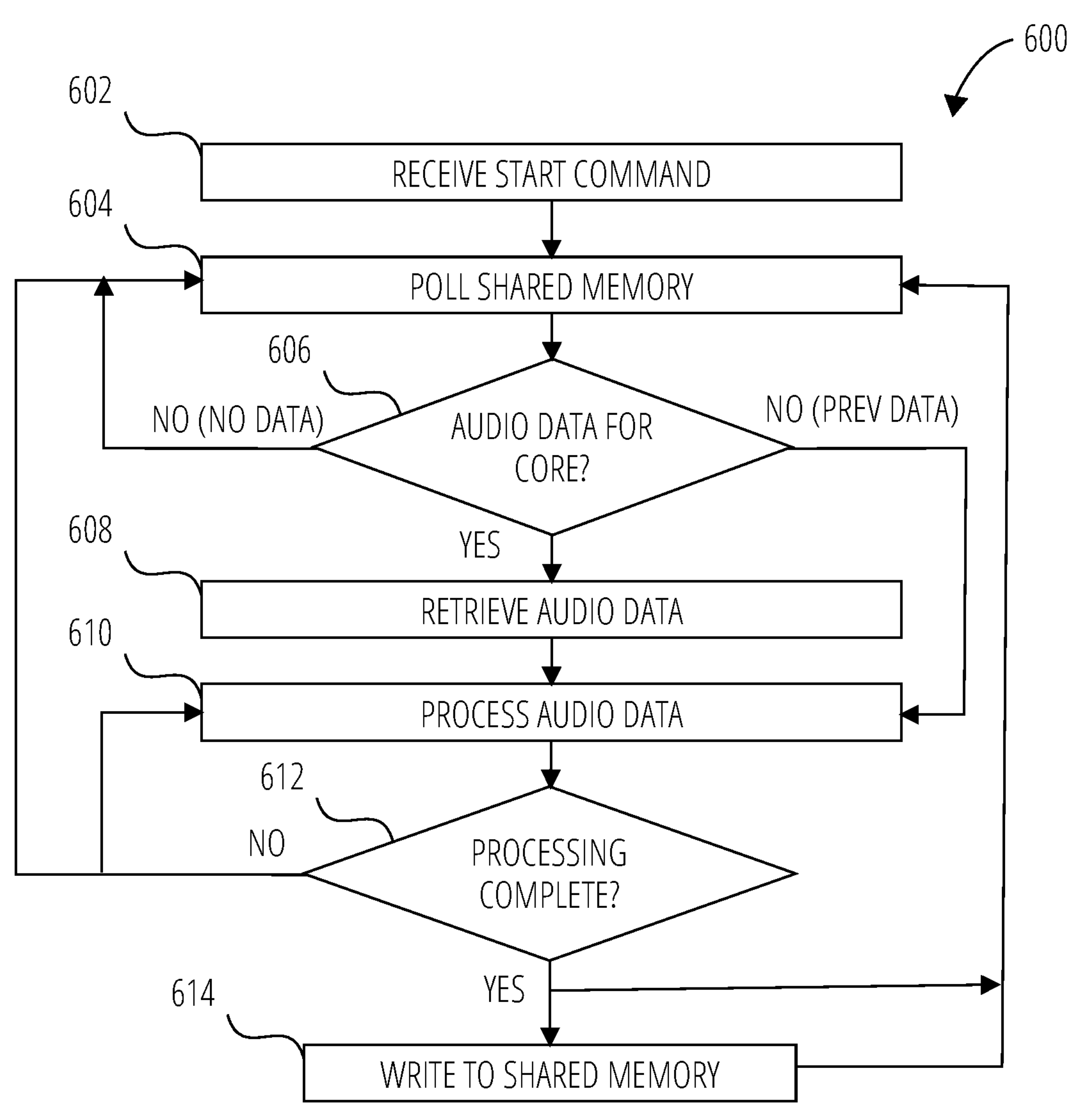
FIG. 6 is a flowchart of a method performed by one of the cores of FIG. 3, according to some examples.

FIG. 6 is a flowchart 600 of a method performed by one of the cores 302, 310, and 316 of FIG. 3, according to some examples. For explanatory purposes, the operations of the flowchart 600 are described herein as occurring in serial, or linearly. However, multiple operations of the flowchart 600 may occur in parallel. In addition, the operations of the flowchart 600 need not be performed in the order shown and/or one or more blocks of the flowchart 600 need not be performed and/or can be replaced by other operations.

The flowchart 600 illustrates the operation of one of the cores, such as core 0 302, core 1 310 or core 2 316 in FIG. 3 as far as it relates to receiving audio data from and writing audio data to shared memory 326. Core 0 302 will additionally receive audio data from audio peripherals input 322 and output audio data to audio peripherals output 324 as specified in its netlist 202.

The method starts at operation 602 with receipt by the core of a start command, which is provided simultaneously to all cores from core 0 302. The core then polls the shared memory in operation 604 to determine if there is any audio data in the packet buffer that is addressed to that particular core, identified by its numeric identifier. If there is no audio data for the core as determined in operation 606 and there is already data being processed, then the core continues to operation 610, and continues to process audio data. In operation 606 if the core is not processing any data, the method returns to polling the shared memory in operation 604 and the method continues from there.

If polling of the shared memory determines that audio data for the core is present in shared memory in operation 604 and operation 606 then the audio data is retrieved from the shared memory 326 in operation 608. Processing of audio data then continues in operation 610. In operation 612 it is determined whether processing of the audio data is complete in operation 612. If processing is complete, the processed audio data is written to the shared memory together with the numerical IDs of a destination core and the current (originating core) and audio data parameters such as sample size and frequency in operation 614. This will typically involve writing the processed audio data to a packet buffer and writing the numerical ID of the destination core, the parameters of the processed audio data (such as frequency and sample size), and a pointer to the location of the processed audio data in the shared memory 326. The method then returns to polling of the shared memory in operation 604.

If processing of the audio is not complete in operation 612 then processing of the audio data continues in operation 610 and the shared memory is polled in operation 604.

It will be appreciated that the flowchart 600 is an illustrative tool that is useful to describe the general functioning of the system described herein, and that the flowchart 600 may not represent an implementation as such. For example, polling of the shared memory is likely to continue in a separate loop from the processing of the audio. Further, completion of processing of the audio by a core will occur when the processed audio data is received at an IPC buffer module, at which point it will be written to the shared memory 326 as specified in that IPC buffer module. A separate check will not have to be performed to determine if processing is complete. Further variations and implementation details will be readily apparent to one of ordinary skill in the art.

Figure 7:
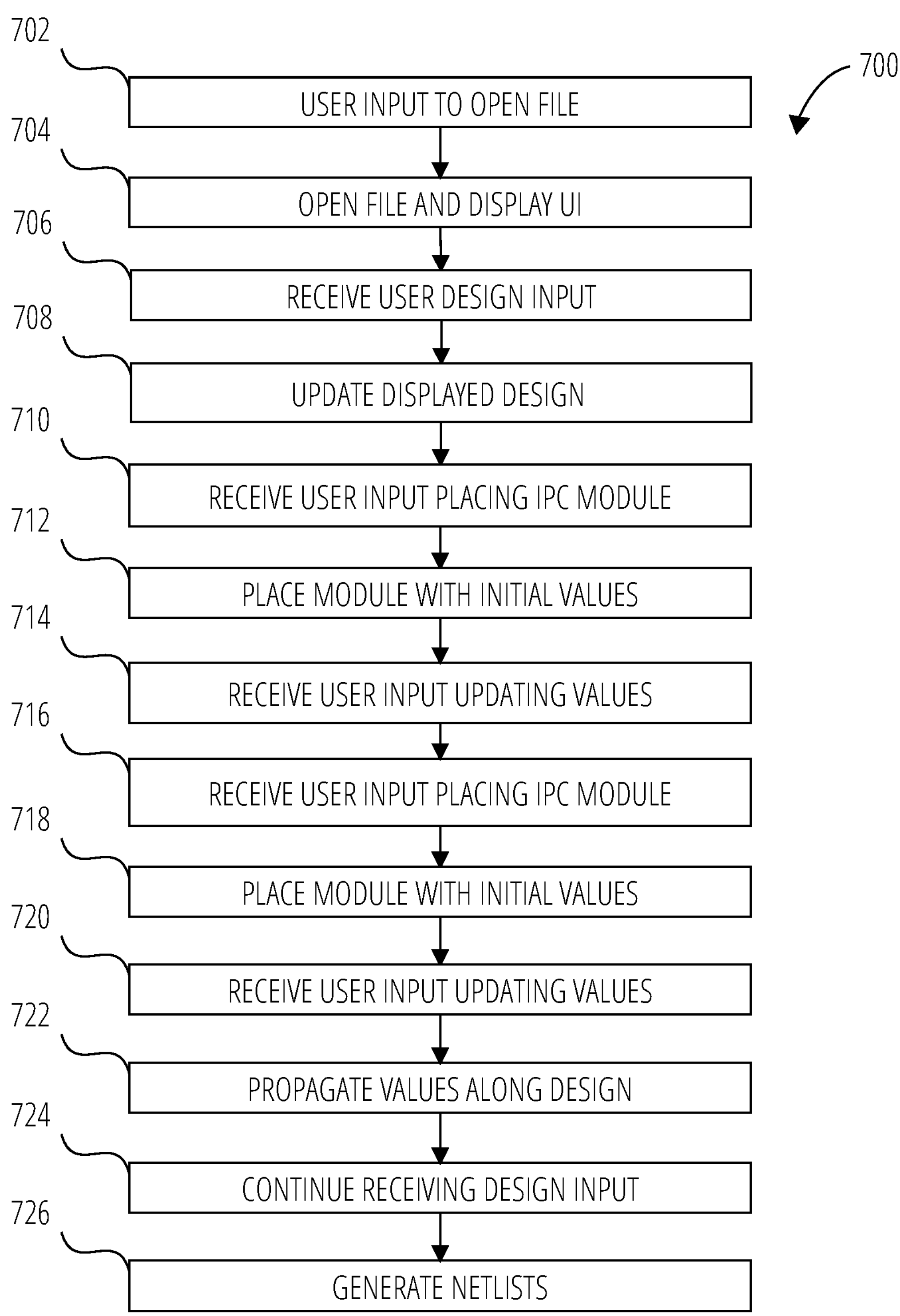
FIG. 7 illustrates a flowchart for generating customized audio processing designs according to some examples.

FIG. 7 illustrates a flowchart 700 for generating customized audio processing designs according to some examples. For explanatory purposes, the operations of the flowchart 700 are described herein as occurring in serial, or linearly. However, multiple operations of the flowchart 700 may occur in parallel. In addition, the operations of the flowchart 700 need not be performed in the order shown and/or one or more blocks of the flowchart 700 need not be performed and/or can be replaced by other operations.

The flowchart 700 illustrates the creation or editing of an audio processing design by a developer of customized audio processing. This is done for example on a developer device 110 that hosts an application for use in developing downloadable custom audio features for the audio DSP core 212. The application is preferably a windows-based graphical design environment that permits the definition of audio processing pathways by assembling and interconnecting various audio processing blocks and specifying associated parameters and interconnections. The flowchart 700 in particular relates to the creation of an audio design utilizing multiple processor cores as discussed above.

The method is described with reference to design software executing on the developer device 110, although many variations are possible, including the design interface and functionality being hosted as an application service on server 106. In such a case, the operations being performed on the server 106 will not involve the display of user interface elements as such, but rather the transmission of data and instructions for causing the display of user interface elements at a remote computing device. Accordingly, "to display an element/displaying of an element" as used herein includes causing of the display of such an element.

The method commences at operation 702 with receipt of user input at the developer device 110 to open an audio processing design file. In response, a new or existing audio processing design file is opened and the design user interface is displayed on the display of the developer device 110 by the design software, in operation 704. In operation 706, user input is received to create or modify an audio processing design. This is performed by receiving user input that selects, positions, interconnects and defines the parameters of design modules, such as those described above with reference to FIGS. 4 & 5. In operation 708, the design software updates and displays the updated design on the display of the client device 108 in operation 708.

Initial elements in the design will always be associated with core 0 302 by default, to receive audio input from audio peripherals input 322 and to provide audio output to audio peripherals output 324. In the event that the designer wants to utilize another core for some of the audio processing, the designer provides input to position an IPC buffer module (such as IPC buffer module 420) at the desired location in the audio design, where it is to diverge from the processing done by core 0 302. In response to receiving such input in operation 710, the design software places and displays the IPC buffer module in the selected location in operation 712, with initial parameter values based either on the parameters of the input to the IPC buffer module (such as such as frequency, sample size and number of channels) at the selected location, or based on default values. The parameters will include an identifier of the core to which the audio data is to be passed. In some examples, the core number will automatically be incremented from the core number from which the audio data is to be passed. In other examples, a dialog box will be displayed requiring express selection from one of the other cores.

User input updating the core identifier and other parameters can then optionally be received at operation 714. Modifications to the parameters of the IPC buffer module will be propagated downstream from the IPC buffer module, in particular as regards the core identifier.

In operation 716, user input to position a further IPC buffer module (such as IPC buffer module 422) at a desired downstream location from the initial IPC buffer module (IPC buffer module 420) in the audio design is received. In response to receiving such input, in operation 718 the design software places the IPC buffer module in the selected location in operation 718, with initial parameter values based either on defaults or on existing parameters in the audio processing design, for example from the upstream IPC buffer module as modified by the audio design elements. In some examples, the core number for the core to which the audio data is to be sent. In some examples, the core number for the core to which the audio data will be sent will automatically be set to the core number from which the audio data was received. In other examples, a dialog box will be displayed requiring express selection from one of the other cores.

User input updating the core identifier and other parameters can then optionally be received at operation 714 at operation 720.

Further user design input can be received in operation 724. This may for example be as discussed above with reference to operations 706, 710, 716 and 722. When the design is complete, user input may be received to generate a netlist 202, which is then performed by the design software in operation 726. The netlist 202 specifies the audio processing design based on the arrangement of the representations of the audio processing modules displayed in the user interface, and comprises individual netlists for each of the cores, specifying audio modules and interconnections for that core as specified in the design by the user. The netlist 202 is then available to be parsed and the individual netlists loaded into the corresponding two or more cores to provide the customized multicore audio processing as discussed above.

Various examples are provided.

Example 1 is a method, executed by one or more processors, the method comprising: receiving user input to generate an audio processing design by placing representations of audio processing modules in a user interface; causing display of the representations of the audio processing modules in the user interface; receiving user input to place a representation of an inter-process communications (IPC) module in the audio processing design coupled to a representation of an upstream audio module, the representation of the IPC module having a target core identifier associated therewith that defines a target core for processing subsequent downstream audio modules; causing the display of the representation of the IPC module in the audio processing design; receiving user input to specify the target core identifier associated with the representation of the IPC module; applying the specified target core identifier downstream from the representation of the IPC module such that the target core identifier is associated with the representations of the subsequent downstream audio modules; and generating the audio processing design based on an arrangement of the representations of the audio processing modules displayed in the user interface.

In Example 2, the subject matter of Example 1 includes, receiving user input to place a further representation of an IPC module in the audio processing design downstream of the initial representation of the IPC module, the further representation of the IPC module having data associated therewith that defines a further target core for processing further downstream audio modules.

In Example 3, the subject matter of Examples 1-2 includes, wherein the generating of the audio processing design comprises generating a set of module identifiers and interconnections for each core specified in the audio processing design.

In Example 4, the subject matter of Example 3 includes, wherein each set of module identifiers and interconnections for each core specified in the audio processing design comprises a netlist.

In Example 5, the subject matter of Examples 3-4 includes, wherein each set of module identifiers and interconnections accesses memory shared between each core specified in the audio processing design, in use.

In Example 6, the subject matter of Example 5 includes, wherein each set of module identifiers and interconnections polls the memory shared between each core specified in the audio processing design in use to determine if audio data for a corresponding core is in the memory.

In Example 7, the subject matter of Examples 3-6 includes, loading each set of module identifiers and interconnections into each corresponding core specified in the audio processing design.

Example 8 is a non-transitory computer-readable storage medium, the computer-readable storage medium including instructions that when executed by a data processor in a multiprocessor system including shared memory, cause the data processor to perform operations comprising: receiving user input to generate an audio processing design by placing representations of audio processing modules in a user interface; causing display of the representations of the audio processing modules in the user interface; receiving user input to place a representation of an inter-process communications (IPC) module in the audio processing design coupled to a representation of an upstream audio module, the representation of the IPC module having a target core identifier associated therewith that defines a target core for processing subsequent downstream audio modules; causing the display of the representation of the IPC module in the audio processing design; receiving user input to specify the target core identifier associated with the representation of the IPC module; applying the specified target core identifier downstream from the representation of the IPC module such that the target core identifier is associated with representations of the subsequent downstream audio modules; and generating the audio processing design based on an arrangement of the representations of the audio processing modules displayed in the user interface.

In Example 9, the subject matter of Example 8 includes, wherein the operations further comprise: receiving user input to place a further representation of an IPC module in the audio processing design downstream of the initial representation of the IPC module, the further representation of the IPC module having data associated therewith that defines a further target core for processing further downstream audio modules.

In Example 10, the subject matter of Examples 8-9 includes, wherein the generating of the audio processing design comprises: generating a set of module identifiers and interconnections for each core specified in the audio processing design.

In Example 11, the subject matter of Example 10 includes, wherein each set of module identifiers and interconnections for each core specified in the audio processing design comprises a netlist.

In Example 12, the subject matter of Examples 10-11 includes, wherein each set of module identifiers and interconnections accesses memory shared between each core specified in the audio processing design, in use.

In Example 13, the subject matter of Examples 11-12 includes, wherein each set of module identifiers and interconnections polls the memory shared between each core specified in the audio processing design in use to determine if audio data for a corresponding core is in the memory.

Example 14 is a method, executed by one or more processors, the method comprising: receiving user input to generate an audio processing design by placing representations of audio processing modules in a user interface; causing display of the representations of the audio processing modules in the user interface; receiving user input to place a representation of an inter-process communications (IPC) module in the audio processing design coupled to a representation of an upstream audio module, the representation of the IPC module having a target instance identifier associated therewith that defines a target processing instance for processing subsequent downstream audio modules; causing the display of the representation of the IPC module in the audio processing design; receiving user input to specify the target instance identifier associated with the representation of the IPC module; applying the specified processing instance identifier downstream from the representation of the IPC module such that the target instance identifier is associated with representations of subsequent downstream audio modules; and generating the audio processing design based on an arrangement of the representations of the audio processing modules displayed in the user interface.

In Example 15, the subject matter of Example 14 includes, receiving user input to place a further representation of an IPC module in the audio processing design downstream of the initial representation of the IPC module, the further representation of the IPC module having data associated therewith that defines a further target processing instance for processing further downstream audio modules.

In Example 16, the subject matter of Examples 14-15 includes, wherein the generating of the audio processing design comprises generating a set of module identifiers and interconnections for each processing instance specified in the audio processing design.

In Example 17, the subject matter of Examples 14-16 includes, wherein each set of module identifiers and interconnections for each processing instance specified in the audio processing design comprises a netlist.

In Example 18, the subject matter of Examples 16-17 includes, wherein each set of module identifiers and interconnections accesses memory shared between each processing instance specified in the audio processing design, in use.

In Example 19, the subject matter of Example 18 includes, wherein each set of module identifiers and interconnections polls the memory shared between each processing instance specified in the audio processing design in use to determine if audio data for a corresponding processing instance is in the memory.

In Example 20, the subject matter of Examples 17-19 includes, wherein each netlist accesses memory shared between each processing instance specified in the audio processing design, in use.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20. Example 23 is a system to implement of any of Examples 1-20. Example 24 is a method to implement of any of Examples 1-20.

Figure 8:
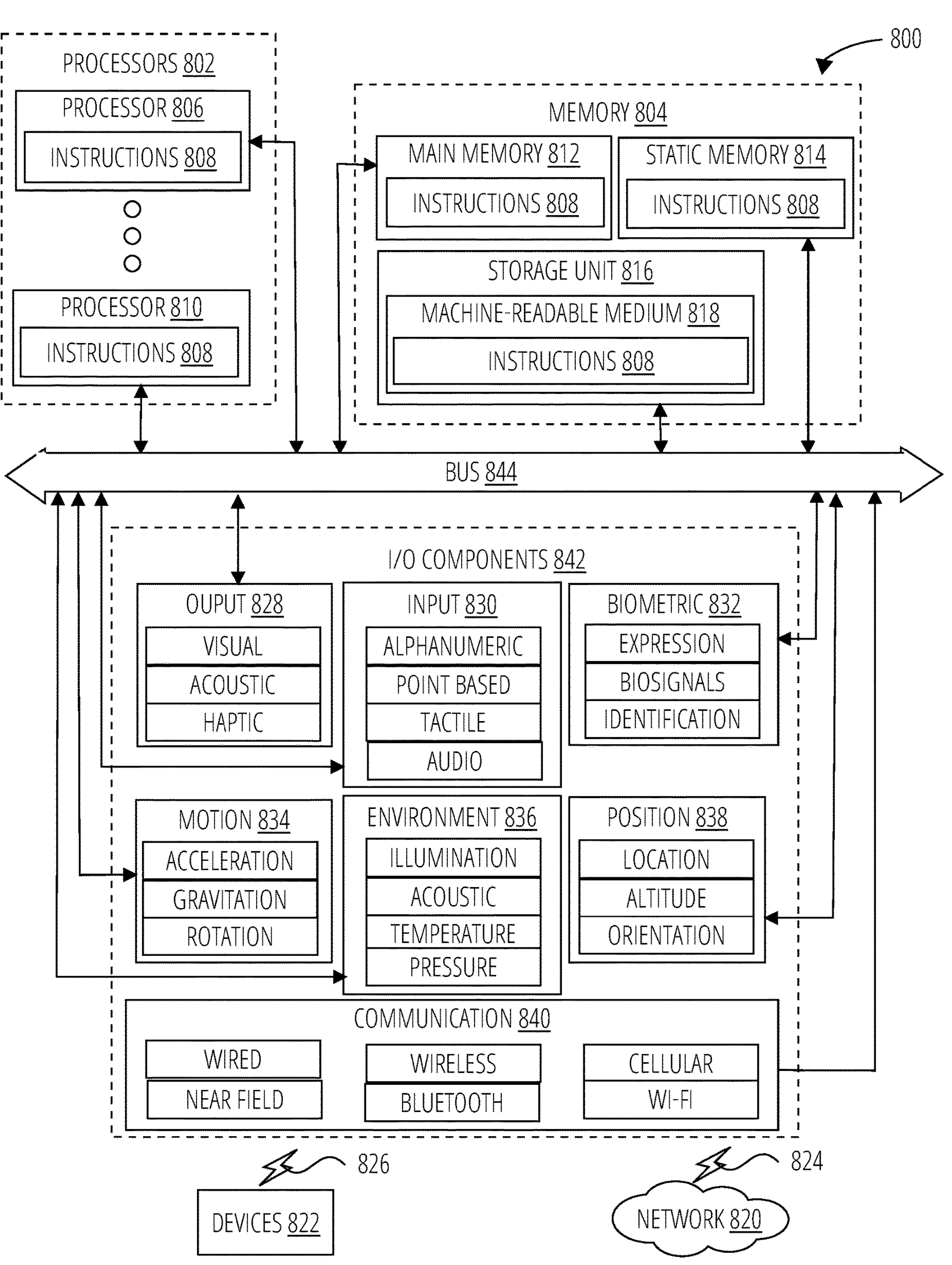
FIG. 8 illustrates a diagrammatic representation of a machine in the form of a computer system within which a set of instructions may be executed for causing the machine to perform any one or more of the methodologies discussed herein, according to an example.

FIG. 8 illustrates a diagrammatic representation of a machine 800 in the form of a computer system within which a set of instructions may be executed for causing the machine to perform any one or more of the methodologies discussed herein, according to an example embodiment. Specifically, FIG. 8 shows a diagrammatic representation of the machine 800 in the example form of a computer system, within which instructions 808 (e.g., software, a program, an application, an applet, an app, or other executable code) for causing the machine 800 to perform any one or more of the methodologies discussed herein may be executed. For example, the instructions 808 may cause the machine 800 to execute the methods described above. The instructions 808 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term “machine” shall also be taken to include a collection of machines 800 that individually or jointly execute the instructions 808 to perform any one or more of the methodologies discussed herein.

The machine 800 may include processors 802, memory 804, and I/O components 842, which may be configured to communicate with each other such as via a bus 844. In an example embodiment, the processors 802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 806 and a processor 810 that may execute the instructions 808. The term "processor" is intended to include multicore processors that may comprise two or more independent processors (sometimes referred to as "cores") that may execute instructions contemporaneously. Although FIG. 8 shows multiple processors 802, the machine 800 may include a single processor with a single core, a single processor with multiple cores (e.g., a multicore processor), multiple processors with a single core, multiple processors with multiples cores, or any combination thereof.

The memory 804 may include a main memory 812, a static memory 814, and a storage unit 816, both accessible to the processors 802 such as via the bus 844. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the processors 802 (e.g., within the processor's cache memory), or any suitable combination thereof, during execution thereof by the machine 800.

The I/O components 842 may include a wide variety of components to receive input, provide output, produce output, transmit information, exchange information, capture measurements, and so on. The specific I/O components 842 that are included in a particular machine will depend on the type of machine. For example, portable machines such as mobile phones will likely include a touch input device or other such input mechanisms, while a headless server machine will likely not include such a touch input device. It will be appreciated that the I/O components 842 may include many other components that are not shown in FIG. 8. The I/O components 842 are grouped according to functionality merely for simplifying the following discussion and the grouping is in no way limiting. In various example embodiments, the I/O components 842 may include output components 828 and input components 830. The output components 828 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 830 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 842 may include biometric components 832, motion components 834, environmental components 836, or position components 838, among a wide array of other components. For example, the biometric components 832 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 842 may include communication components 840 operable to couple the machine 800 to a network 820 or devices 822 via a coupling 824 and a coupling 826, respectively. For example, the communication components 840 may include a network interface component or another suitable device to interface with the network 820. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 822 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multidimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geolocation, location via Wi-Fi® signal triangulation, location via detecting an NFC beacon signal that may indicate a particular location, and so forth.

The various memories (such as memory 804, main memory 812, static memory 814, and/or memory of the processors 802) and/or storage unit 816 may store one or more sets of instructions and data structures (e.g., software) embodying or utilized by any one or more of the methodologies or functions described herein. These instructions (e.g., the instructions 808), when executed by processors 802, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 820 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 820 or a portion of the network 820 may include a wireless or cellular network, and the coupling 824 may be a Code Division Multiple Access (CDMA) connection, a Global System for Mobile communications (GSM) connection, or another type of cellular or wireless coupling. In this example, the coupling 824 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 808 may be transmitted or received over the network 820 using a transmission medium via a network interface device (e.g., a network interface component included in the communication components 840) and utilizing any one of a number of well-known transfer protocols (e.g., hypertext transfer protocol (HTTP)). Similarly, the instructions 808 may be transmitted or received using a transmission medium via the coupling 826 (e.g., a peer-to-peer coupling) to the devices 822. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 808 for execution by the machine 800, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method, executed by one or more processors, the method comprising:

receiving user input to generate an audio processing design by placing blocks representing audio processing modules in a user interface;

causing display of the blocks representing the audio processing modules in the user interface;

receiving user input to place a block representing an inter-process communications (IPC) module in the audio processing design coupled to a representation of an upstream audio module, the block representing the IPC module having a target core identifier associated therewith that defines a target core for processing subsequent downstream audio modules;

causing the display of the block representing the IPC module in the audio processing design;

receiving user input to specify the target core identifier associated with the block representing the IPC module;

applying the specified target core identifier downstream from the block representing the IPC module such that the audio processing associated with the blocks representing the subsequent downstream audio modules is specified to be performed by the target core identified by the target core identifier; and generating the audio processing design based on an arrangement of the blocks representing the audio processing modules displayed in the user interface.

2. The method of claim 1, further comprising:

receiving user input to place a further block representing an IPC module in the audio processing design downstream of the initial-representation of block representing the IPC module, the further block representing the IPC module having data associated therewith that defines a further target core for processing further downstream audio modules.

3. The method of claim 1, wherein the generating of the audio processing design comprises generating a set of module identifiers and interconnections for each core specified in the audio processing design.

4. The method of claim 3, wherein each set of module identifiers and interconnections for each core specified in the audio processing design comprises a netlist.

5. The method of claim 3, wherein each set of module identifiers and interconnections accesses memory shared between each core specified in the audio processing design, in use.

6. The method of claim 5, wherein each set of module identifiers and interconnections polls the memory shared between each core specified in the audio processing design in use to determine if audio data for a corresponding core is in the memory.

7. The method of claim 3, further comprising loading each set of module identifiers and interconnections into each corresponding core specified in the audio processing design.

8. A non-transitory computer-readable storage medium, the computer-readable storage medium including instructions that when executed by a data processor in a multiprocessor system including shared memory, cause the data processor to perform operations comprising:

receiving user input to generate an audio processing design by placing blocks representing audio processing modules in a user interface;

causing display of the blocks representing the audio processing modules in the user interface;

receiving user input to place a block representing an inter-process communications (IPC) module in the audio processing design coupled to a representation of an upstream audio module, the block representing the IPC module having a target core identifier associated therewith that defines a target core for processing subsequent downstream audio modules;

causing the display of the block representing the IPC module in the audio processing design;

receiving user input to specify the target core identifier associated with the block representing the IPC module;

applying the specified target core identifier downstream from the-representation of block representing the IPC module such that the audio processing associated with-blocks representing the subsequent downstream audio modules is specified to be performed by the target core identified by the target core identifier; and generating the audio processing design based on an arrangement of the blocks representing the audio processing modules displayed in the user interface.

9. The non-transitory computer-readable storage medium of claim 8, wherein the operations further comprise:

receiving user input to place a further block representing an IPC module in the audio processing design downstream of the initial block representing the IPC module, the further block representing the IPC module having data associated therewith that defines a further target core for processing further downstream audio modules.

10. The non-transitory computer-readable storage medium of claim 8, wherein the generating of the audio processing design comprises:

generating a set of module identifiers and interconnections for each core specified in the audio processing design.

11. The non-transitory computer-readable storage medium of claim 10, wherein each set of module identifiers and interconnections for each core specified in the audio processing design comprises a netlist.

12. The non-transitory computer-readable storage medium of claim 10, wherein each set of module identifiers and interconnections accesses memory shared between each core specified in the audio processing design, in use.

13. The non-transitory computer-readable storage medium of claim 12, wherein each set of module identifiers and interconnections polls the memory shared between each core specified in the audio processing design in use to determine if audio data for a corresponding core is in the memory.

14. A method, executed by one or more processors, the method comprising:

receiving user input to generate an audio processing design by placing blocks representing audio processing modules in a user interface;

causing display of the blocks representing the audio processing modules in the user interface;

receiving user input to place a block representing an inter-process communications (IPC) module in the audio processing design coupled to a representation of an upstream audio module, the block representing the IPC module having a target instance identifier associated therewith that defines a target processing instance for processing subsequent downstream audio modules;

causing the display of the block representing the IPC module in the audio processing design;

receiving user input to specify the target instance identifier associated with the block representing the IPC module;

applying the specified processing instance identifier downstream from the block representing the IPC module such that the audio processing associated with blocks representing subsequent downstream audio modules is specified to be performed by the target processing instance identified by the target core identifier; and generating the audio processing design based on an arrangement of the blocks representing the audio processing modules displayed in the user interface.

15. The method of claim 14, further comprising:

receiving user input to place a further block representing an IPC module in the audio processing design downstream of the initial block representing the IPC module, the further block representing the IPC module having data associated therewith that defines a further target processing instance for processing further downstream audio modules.

16. The method of claim 14, wherein each set of module identifiers and interconnections for each processing instance specified in the audio processing design comprises a netlist.

17. The method of claim 16, wherein each netlist accesses memory shared between each processing instance specified in the audio processing design, in use.

18. The method of claim 14, wherein the generating of the audio processing design comprises generating a set of module identifiers and interconnections for each processing instance specified in the audio processing design.

19. The method of claim 18, wherein each set of module identifiers and interconnections accesses memory shared between each processing instance specified in the audio processing design, in use.

20. The method of claim 19, wherein each set of module identifiers and interconnections polls the memory shared between each processing instance specified in the audio processing design in use to determine if audio data for a corresponding processing instance is in the memory.

* * * * *